3,427,119
SYNTHETIC LINEAR POLYAMIDES WHICH HAVE BEEN COLORED WITH MONOAZO INDOLE PHTHALIMIDE DYES
Johannes Dehnert and Walter Grosch, Ludwigshafen (Rhine), Germany, assignors to Badische Anilin- & Soda-Fabrik Aktiengesellschaft, Ludwigshafen (Rhine), Germany
No Drawing. Filed July 7, 1965, Ser. No. 470,244
U.S. Cl. 8—41
6 Claims
Int. Cl. D06p 1/02, 3/24

This invention relates to textile materials of synthetic linear polyamides which have been colored with dyes having the general formula:

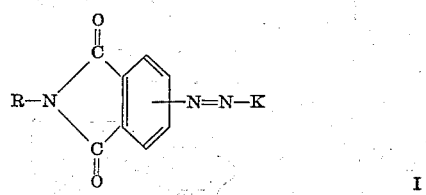

I in which R denotes a hydrogen atom, an aliphatic radical or a cycloaliphatic radical and K denotes the radical of an indole which is free from sulfonic acid groups and which is capable of coupling.

Many azo dyes are already known which are suitable for coloring synthetic linear polyamides. Some of the prior art dyes give on polyamide colors which are in some cases distinguished by very good fastness, such as light fastness, thermal stability or wet fastness. Only very few dyes are known however which combine high color strength, good light fastness, good heat resistance and good wet fastness.

Dyes are also already known which have been derived from aminophthalimides. These prior art dyes may be used for coloring polyamides but they only yield dyeings having unsatisfactorily light fastness. Their suitability for coloring polyamides has therefore not been described in the prior art literature.

It is an object of this invention to provide dyes which are outstandingly suitable for coloring synthetic linear polyamides and which yield colorations which have very good light fastness combined with good general fastness.

This object is achieved with dyes having the above formula. Colorations obtained therewith have extremely high color strength, very good light fastness and outstanding heat resistance.

The dyes having the above Formula I may be obtained by a conventional method by coupling diazotized aminophthalimides with indoles. Examples of suitable aminophthalimides are 3-aminophthalimide, 4-aminophthalimide or the substitution products thereof bearing methyl, ethyl, propyl-(1), propyl-(2), n-butyl-(1), n-butyl-(2), isobutyl, tertiary butyl, 2-ethylhexyl or cyclohexyl radicals on the imide nitrogen atom.

The term aliphatic or cycloaliphatic radicals includes radicals which contain not only carbon and hydrogen.

The said radicals may accordingly contain substituents in turn, for example halogen atoms, such as fluorine, chlorine or bromine, cyano groups, carboxylic acid groups, carboxylic ester groups, carbamoyl groups, sulfonamide groups, or acyl groups, such as acetyl groups or benzoyl groups, and also alkoxy groups, hydroxy groups or amino groups. The aliphatic radicals may also contain aromatic substituents. The aliphatic radicals may also contain in combination quaternary ammonium groups or heterocyclic rings, such as pyrrolidine, piperazine, morpholine or thiomorpholine-S-dioxide.

To prepare the 3-aminophthalimides and 4-aminophthalimides which are substituted on the imide nitrogen atom and which are to be used as diazo components, for example 3-nitrophthalic acid or 4-nitrophthalic acid or their esters, anhydrides or imides free from substituents on the imide nitrogen atom may be reacted by heating them with an appropriate amine, in the presence or absence of a diluent, and the resultant N-substituted 3-nitrophthalimides or 4-nitrophthalimides may be reduced by conventional methods to 3-aminophthalimides or 4-aminophthalimides. Mixtures of 3-aminophthalimides and 4-aminophthalimides may also be used, such as are obtained by not isolating the components after the nitration of phthalic anhydride and reaction with an amine.

Diazotization of the aminophthalimide, depending on its solubility, may be carried out in aqueous hydrochloric acid medium or in organic solvents, for example in glacial acetic acid or in mixtures of water and organic solvents.

Indoles having unsubstituted or substituted alkyl or aryl radicals in 1-position and/or 2-position are particularly suitable as indoles which are free from sulfonic acid groups and which are capable of coupling. Specific examples are: 2-methylindole, 1-(β-cyanoethyl)-2-methylindole, β-(2-methylindolyl-(1))-propionamide, 2-phenylindole, 1-methyl-2-phenylindole, 1-(β-cyanoethyl)-2-phenylindole, β- 2-phenylindolyl-(1))-propionamide and β-(2-phenylindolyl-(1))-propionic acid.

Examples of synthetic linear polyamide textile materials are fibers, flock, filaments, threads, woven fabrics and knitted fabrics of polycaprolactam, polyhexamethylene diamine adipate or poly-omegaaminoundecylic acid.

The dyes having the Formula I are advantageously used in finely divided form for the production of colored textile materials of synthetic linear polyamides. In general coloring is carried out from a weakly alkaline to strong acid liquor, but preferably from a neutral to weakly acid liquor, and advantageously at temperatures of from 90° to 100° C. The usual assistants may be used, such as sulfonated sperm oil alcohol or the reaction product of 1 mole of castor oil with 40 moles of ethylene oxide.

To prepare prints on polyamides according to this invention, print pastes are used which contain, in addition to conventional thickening agents, such as crystal gum, alginates, carob bean flour, and if necessary conventional printing assistants, such as resorcinol or β-naphthol, normally from 1 to 50 parts by weight of dye to 1000 parts by weight of print paste. After the material has been printed, it is steamed as usual or subjected to a heat treatment and then finished off.

The dyes to be used according to this invention may be applied in accordance with the so-called thermosol process. For this the polyamide woven fabric is padded for example in a liquor containing per liter about 1 to 50 parts of dye and the conventional assistants such as ethenoxylated alcohols and, if desired, thickening agents, squeezed out to between 50% and 100% moisture retention, dried and fixed for one minute at about 190° to 210° C. Then the fabric is rinsed and dried as usual.

The colored textile material obtained by the above-mentioned method normally contains at most 3% by weight of the dye applied to the fabric. Medium depth colorations are for example 0.3% to 0.1% by weight. Less than 0.3%, for example 0.05% to 0.1% is sufficient for pastel shades.

The invention is further illustrated by the following examples in which the parts mentioned, unless otherwise stated, are parts by weight. Parts by volume bear the same relation to parts by weight as the liter (STP) to the kilogram. Percentages are also by weight.

Example 1

100 parts of polyamide cloth is colored in a bath which contains 1 part of the azo dye described below in finely divided form and 2 parts of sulfonated sperm oil alcohol in 2000 parts of water, for ninety minutes at 95° to 100° C. A bright golden yellow coloration is obtained which has very good light fastness and excellent resistance to thermofixing.

The dye used in paragraph 1 of this example is obtained as follows:

30 parts by volume of 23% aqueous sodium nitrite solution is allowed to flow slowly at 0° to 3° C. while stirring into a mixture of 23.4 parts of 4-aminophthalic acid-3'-methoxypropylimide, 250 parts of water and 25 parts by volume of concentrated hydrochloric acid. The whole is stirred for another two hours at the same temperature and any excess of nitrous acid is then removed. Aqueous sodium acetate solution is then added in such an amount to the solution of the diazonium salt that a pH value of 4 is set up. This mixture is allowed to flow slowly into a solution of 20 parts of 2-phenylindole in 500 parts of dimethylformamide. When coupling is over, the dye is filtered off, washed with water and dried.

Fast colorations are obtained in the same way when the dyes given in the following table are used.

| Example | Diazo component | Coupling component | Shade |
|---|---|---|---|
| 2 | 4-aminophthalic acid-3'-methoxypropylimide (CH₃OCH₂CH₂CH₂N-imide with NH₂) | 2-phenylindole (NH) | Reddish yellow. |
| 3 | HOCH₂CH₂N-phthalimide with NH₂ | 2-phenylindole (NH) | Orange. |
| 4 | HOCH₂CH₂N-phthalimide with NH₂ (different position) | 2-phenylindole (NH) | Do. |
| 5 | H₉C₄N-phthalimide with NH₂ | 2-phenylindole, N-CH₂CH₂CN | Reddish yellow. |
| 6 | H₉C₄N-phthalimide with NH₂ | 2-methylindole, N-CH₂CH₂CN | Do. |
| 7 | H₉C₄N-phthalimide with NH₂ | 2-phenylindole, N-CH₂CH₂CONH₂ | Do. |
| 8 | HOCH₂CH₂N-phthalimide with NH₂ | 2-phenylindole, N-CH₂CH₂CONH₂ | Yellow. |
| 9 | HOCH₂CH₂N-phthalimide with NH₂ | 2-methylindole, N-CH₂CH₂CN | Do. |

TABLE—Continued

| Example | Diazo component | Coupling component | Shade |
|---|---|---|---|
| 10 | 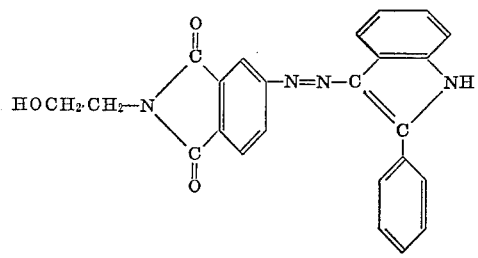 | 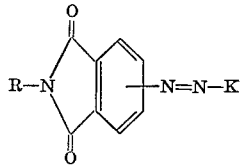 | Reddish yellow. |
| 11 | 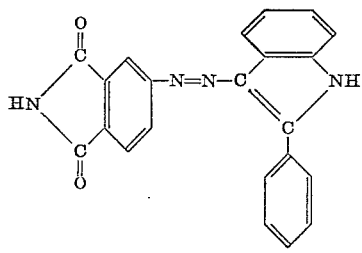 | 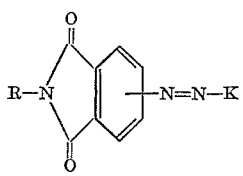 | Do. |

Example 12

100 parts of polycaprolactam flock is colored for thirty minutes at boiling temperature in a liquor consisting of 2000 parts of water, 0.4 part of the finely divided dye having the formula:

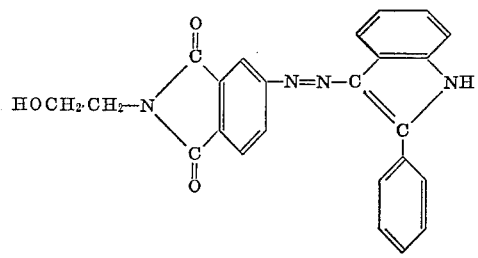

2 parts of 25% aqueous ammonia solution and 2 parts of the product obtained by adding 80 moles of ethylene oxide on to 1 mole of sperm oil alcohol followed by sulfonation. 4 parts of ammonium sulfate is added and coloring takes a further thirty minutes at 98° to 100° C. The yellow coloration obtained is very fast to light and wet.

Example 13

100 parts of a knitted polycaprolactam fabric is colored in a liquor consisting of 3000 parts of water, 0.6 part of the finely divided dye having the formula:

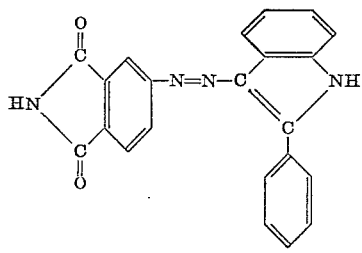

3 parts of the reaction product of 1 mole of castor oil and 40 parts of ethylene oxide for ninety minutes at 95° to 100° C. The orange coloration obtained is very fast to light and wet.

We claim:
1. Textile materials of linear synthetic polyamides colored by compounds of the formula

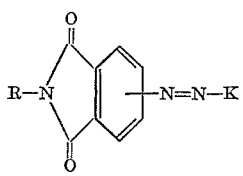

wherein R represents a hydrogen atom, an aliphatic or cycloaliphatic radical and K represents the radical of an indole which is free from sulfonic acid groups and which is capable of coupling where azo is attached to 3-carbon of indole ring and 2-carbon of the indole ring has alkyl or aryl substituents.

2. Colored textile materials of linear synthetic polyamides colored by a compound of the general formula

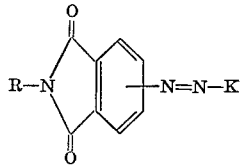

wherein R represents methyl, ethyl, hydroxyethyl, propyl-(1), propyl-(2), 3-methoxypropyl, 3-dimethylaminopropyl, n-butyl-(1), n-butyl-(2), isobutyl, tert. butyl, 2-ethylhexyl or cyclohexyl and K represents a radical of 2-methylindole, 1-(β-cyanoethyl)-2-methylindole, β-(2-methylindolyl-(1))-propionic acid amide, 2-phenylindole, 1 - methyl-2-phenylindole, 1-(β-cyanoethyl)-2-phenylindole, β-(2-phenylindolyl-(1))-propionic acid amide or β-(2-phenylindolyl-(1))-propionic acid.

3. Textile materials of linear synthetic polyamides colored by the dye of the formula

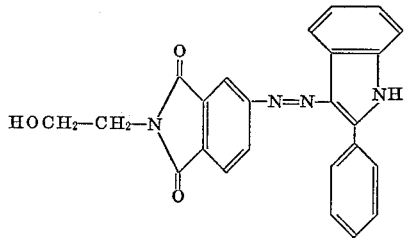

4. Textile materials of linear synthetic polyamides colored by the dye of the formula

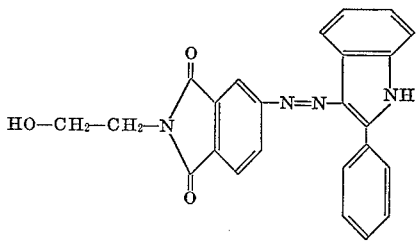

5. Textile materials of linear synthetic polyamides colored by the dye of the formula

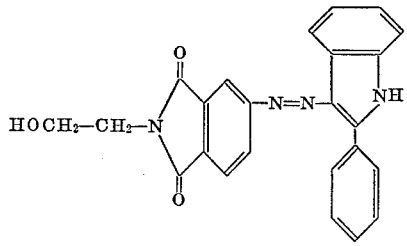

6. Textile materials of linear synthetic polyamides colored by the dye of the formula
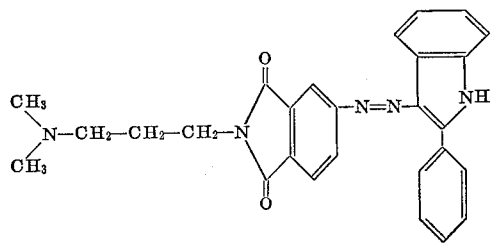
References Cited
UNITED STATES PATENTS
2,159,542  5/1939  Apotheker et al.
FOREIGN PATENTS
353,826  6/1961  Switzerland.
NORMAN G. TORCHIN, *Primary Examiner.*
JOHN E. CALLAGHAN, *Assistant Examiner.*
U.S. Cl. X.R.
260—165

UNITED STATES PATENT OFFICE

CERTIFICATE OF CORRECTION

Patent No. 3,427,119  February 11, 1969

Johannes Dehnert et al.

It is certified that error appears in the above identified patent and that said Letters Patent are hereby corrected as shown below:

In the heading to the printed specification, after line 9, insert -- Claims priority, application, Germany, July 16, 1964, B 77,695 --.

Signed and sealed this 21st day of April 1970.

(SEAL)
Attest:

Edward M. Fletcher, Jr.  WILLIAM E. SCHUYLER, JR.
Attesting Officer  Commissioner of Patents